(12) United States Patent
Howard et al.

(10) Patent No.: US 8,161,771 B2
(45) Date of Patent: Apr. 24, 2012

(54) METHOD AND APPARATUS FOR SEPARATING AIR

(75) Inventors: Henry Edward Howard, Grand Island, NY (US); Martin L. Timm, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 1198 days.

(21) Appl. No.: 11/858,158

(22) Filed: Sep. 20, 2007

(65) Prior Publication Data

US 2009/0078000 A1    Mar. 26, 2009

(51) Int. Cl.
*F25J 3/00* (2006.01)

(52) U.S. Cl. ............... 62/643; 62/640; 62/648; 62/649; 62/650; 62/653

(58) Field of Classification Search .............. 62/640, 62/643, 648–650, 653
See application file for complete search history.

(56) References Cited

U.S. PATENT DOCUMENTS

| | | | |
|---|---|---|---|
| 522,549 A | 7/1894 | Barnard | |
| 4,091,633 A * | 5/1978 | Linde | 62/643 |
| 4,325,719 A * | 4/1982 | Yamazaki | 62/646 |
| 4,599,097 A | 7/1986 | Petit et al. | |
| 4,834,785 A * | 5/1989 | Ayres | 62/650 |
| 5,122,174 A | 6/1992 | Sunder et al. | |
| 5,699,671 A | 12/1997 | Lockett et al. | |
| 5,799,510 A * | 9/1998 | Mostello | 62/653 |
| 5,899,093 A | 5/1999 | Ha | |
| 5,901,578 A * | 5/1999 | Wong et al. | 62/646 |
| 5,924,307 A * | 7/1999 | Nenov | 62/643 |
| 5,924,308 A | 7/1999 | Rathbone | |
| 7,472,551 B2 * | 1/2009 | May | 62/50.7 |
| 2008/0092590 A1 * | 4/2008 | Yearout | 62/643 |

FOREIGN PATENT DOCUMENTS

EP            589646 A1 *   3/1994
* cited by examiner

*Primary Examiner* — Cheryl J Tyler
*Assistant Examiner* — Indrajit Ghosh
(74) *Attorney, Agent, or Firm* — David M. Rosenblum

(57) ABSTRACT

Method and apparatus of separating a nitrogen from a compressed and purified feed stream in a cryogenic rectification plant that employs a distillation column to produce a nitrogen-rich vapor as a column overhead and an oxygen-rich liquid column bottoms. Reflux is generated for the column by condensing part of the nitrogen-rich vapor within a down-flow heat exchanger. A stream of the oxygen-rich liquid column bottoms is introduced into an ejector which draws a stream of an oxygen-rich liquid phase produced from the outlet of a down-flow heat exchanger. The combined oxygen-rich liquid exiting the ejector is fed to the down-flow heat exchanger to condense the nitrogen-rich vapor. In such manner, part of the oxygen-rich liquid phase is recirculated to prevent dry-out of the down-flow heat exchanger outlet and to maintain effective condensation of the nitrogen-rich vapor.

7 Claims, 1 Drawing Sheet

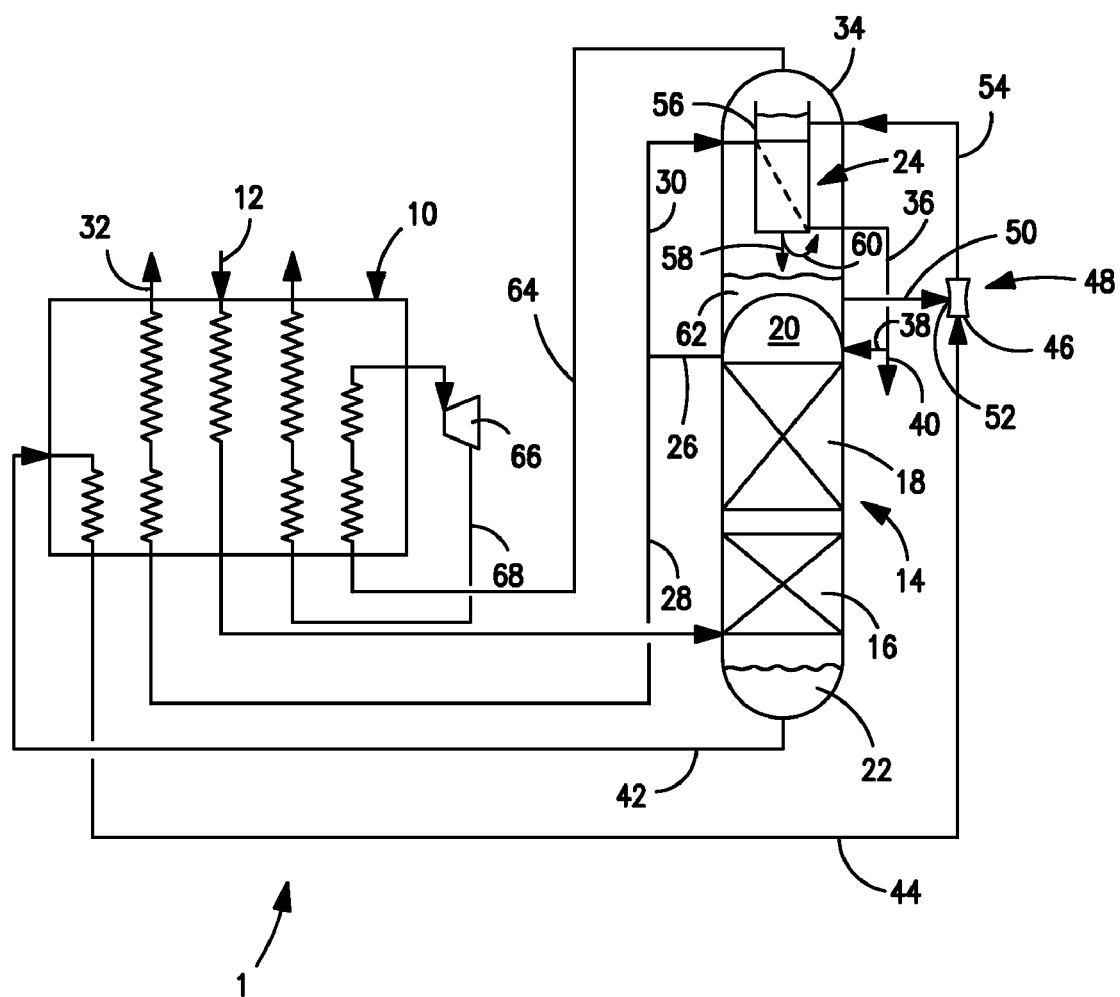

METHOD AND APPARATUS FOR SEPARATING AIR

FIELD OF THE INVENTION

The present invention relates to a method and apparatus for separating nitrogen from a compressed and purified feed within a cryogenic rectification plant employing a distillation column in which a part of a nitrogen-rich vapor column overhead produced in the distillation column is condensed in a down-flow heat exchanger. An ejector is employed to recirculate residual oxygen-rich liquid exiting the down-flow heat exchanger in order to prevent dry-out within the heat exchanger.

BACKGROUND OF THE INVENTION

Nitrogen is separated from a nitrogen and oxygen containing feed, typically air, within a cryogenic plant employing at least one distillation column. Such plants are known in the art as nitrogen generators. The compressed and purified feed is cooled to a temperature suitable for rectification within the distillation column by way of a main heat exchanger. The resultant cooled feed is then introduced into a bottom region of the distillation column to produce a nitrogen-rich vapor as a column overhead and an oxygen-rich liquid column bottoms.

In order to reflux the column, a heat exchanger is employed to condense a stream of the nitrogen-rich vapor by indirect heat exchange with a stream of the oxygen-rich liquid column bottoms that is depressurized and cooled by way of an expansion valve. A further part of the nitrogen-rich vapor can be warmed within the main heat exchanger against cooling incoming feed along with an oxygen enriched waste stream that is produced by substantially vaporizing oxygen-rich liquid column bottoms. The oxygen enriched waste stream may be warmed directly in the main heat exchanger or partially warmed and turboexpanded to produce an exhaust stream that may then be fully warmed within the main heat exchanger. Waste turboexpansion serves to cool the exhaust stream in order to refrigerate the plant. Alternatively, the expansion of part of the incoming feed or product nitrogen streams can be used for such purposes of refrigeration.

Typically, the heat exchanger used to generate reflux for the distillation column functions by way of a thermosiphon effect. In a thermosiphon driven heat exchanger, the depressurized oxygen-rich liquid column bottoms is introduced into a vessel containing the heat exchanger. The heat exchanger is at least partially submerged within the liquid. Liquid entering the heat exchanger passages is partially vaporized which decreases the stream density and makes the liquid rise within the heat exchanger. During the process, the liquid indirectly exchanges heat with the condensing nitrogen-rich vapor. There exist several problems with a thermosiphon type heat exchanger. In general, the exit vapor fraction required to sustain adequate circulation is quite low. As a consequence, substantial mixing losses are incurred (the oxygen concentration of the boiling pool is substantially higher than the concentration of the depressurized column bottoms). In addition, a larger temperature difference must be maintained in order to overcome the static head created by the submergence of the heat exchanger. These factors translates into higher plant compression requirements relative to plants employing down-flow heat exchangers which allow closer temperature approaches with reduced levels of recirculation.

In the prior art, down-flow heat exchangers have been described extensively for use in high purity oxygen plants. The down-flow heat exchanger is disposed within the bottom region of the lower pressure column to evaporate an oxygen-rich liquid column bottoms against the condensing nitrogen-rich column overhead of a higher pressure column. Down-flow heat exchangers can incorporate a plurality of parallel plates and fins to form passages for the fluids between the plates. Additionally, down-flow heat exchangers can have a shell and tube configuration in which the nitrogen-rich vapor is fed to the shell that contains tubes supported by opposed tube sheets and the oxygen-rich liquid is distributed to the tubes by way of a liquid distributor. As the liquid falls within such a heat exchanger, the oxygen-rich liquid partly vaporizes to condense the nitrogen-rich vapor.

In practically employing down-flow heat exchangers in the prior art, the oxygen-rich liquid from the sump of the lower pressure column is recirculated to the liquid distributor to prevent all of the liquid from being evaporated. In one patent, U.S. Pat. No. 5,799,510, this circulation is provided by an ejector in which liquid oxygen contained in the sump of the low pressure column is pumped to produce a high pressure oxygen product. Part of the pump stream is introduced as a motive fluid into the ejector for such recirculation purposes. Alternatively, in U.S. Pat. No. 5,924,308, a valve is used to partially depressurize a lower pressure column liquid oxygen stream. The two phase mixture is recondensed in a separate heat exchanger and fed back to the top of the down-flow heat exchanger. This patent discloses a process which is complicated by additional heat exchanger equipment and spatial requirements. Furthermore its application is directed at high purity oxygen plants.

Neither of these two methods is particularly advantageous for a single column nitrogen generator because generally there is no pressurized product that can serve as a motive fluid and the use of a separate heat exchanger will negatively impact fabrication costs.

As will be discussed, the present invention provides a cryogenic rectification plant employing a distillation column for producing a nitrogen-rich vapor as column overhead in which reflux is generated for the column with the use of a down-flow heat exchanger in which circulation is produced by an ejector but the motive fluid is advantageously the oxygen-rich liquid column bottoms rather than the residual sump liquid produced by the down-flow heat exchanger.

SUMMARY OF THE INVENTION

The present invention provides a method of separating nitrogen product from a compressed and purified feed stream that comprises nitrogen and oxygen.

In accordance with the method, nitrogen is separated from the compressed and purified feed stream within a distillation column of a cryogenic rectification plant to produce a nitrogen-rich vapor column overhead and an oxygen-rich liquid column bottoms. Reflux is generated for the distillation column within the cryogenic rectification plant by condensing a portion of the nitrogen-rich vapor within a down-flow heat exchanger associated with the distillation column through indirect heat exchange with a combined oxygen-rich liquid stream, thereby partially vaporizing the combined oxygen-rich liquid into an oxygen-rich liquid phase and an oxygen-rich vapor phase.

An oxygen-rich liquid column bottoms stream composed of the oxygen-rich liquid column bottoms is introduced into an ejector as a motive fluid and a stream of the oxygen-rich liquid phase is drawn into the ejector and into the oxygen-rich liquid column bottoms stream, thereby to form the combined oxygen-rich stream. The combined oxygen-rich stream is discharged from the ejector to the down-flow heat exchanger thereby to recirculate part of the oxygen-rich liquid phase thereto. The combined oxygen-rich stream being discharged from the ejector at a pressure sufficient to condense the nitrogen-rich vapor within the down-flow heat exchanger.

The compressed and purified feed stream is cooled within a main heat exchanger of the cryogenic rectification plant to a temperature suitable for its rectification. An oxygen enriched vapor stream composed of the oxygen-rich vapor phase is partially warmed within the main heat exchanger and introduced into a turboexpander to produce an exhaust stream. The exhaust stream is recirculated back to the main heat exchanger and fully warmed therein to refrigerate the cryogenic rectification plant. Additionally, the oxygen-rich liquid column bottoms stream is subcooled within the main heat exchanger.

In any embodiment of the present invention, the compressed and purified feed stream can be composed of air.

In another aspect, the present invention provides an apparatus for separating a nitrogen from a compressed and purified feed stream comprising nitrogen and oxygen.

In accordance with this aspect of the present invention, the apparatus comprises a cryogenic rectification plant having a main heat exchanger for cooling the compressed and purified feed stream to a temperature suitable for its rectification and a distillation column connected to the main heat exchanger for rectifying the compressed and purified feed stream and thereby producing a nitrogen-rich vapor overhead and an oxygen-rich liquid column bottoms.

A down-flow heat exchanger is operatively associated with the distillation column for generating reflux for the distillation column. The down-flow heat exchanger is connected to the distillation column so as to condense part of the nitrogen-rich vapor through indirect heat exchange with a combined oxygen-rich liquid stream. This partially vaporizes the combined oxygen-rich liquid stream into an oxygen-rich liquid phase and an oxygen-rich vapor phase.

An ejector having a high pressure inlet is in flow communication with a bottom region of the distillation column so that an oxygen-rich liquid column bottoms stream enters the ejector as a motive fluid. A low pressure inlet of the ejector is in flow communication with the down-flow heat exchanger so as to draw a stream of the oxygen-rich liquid phase into the oxygen-rich liquid column bottoms stream and form the combined oxygen-rich liquid stream. An outlet of the ejector is connected to the down-flow heat exchanger to discharge the combined oxygen-rich liquid stream to the down-flow heat exchanger, thereby to recirculate part of the oxygen-rich phase back to the down-flow heat exchanger. The ejector is configured such that the combined oxygen-rich liquid stream is at a sufficiently low pressure so as to enable the combined oxygen-rich stream to condense the part of the nitrogen-rich vapor within the down-flow heat exchanger.

The main heat exchanger can be configured to partially warm the oxygen enriched waste stream and to fully warm an exhaust stream produced by expanding the oxygen enriched waste stream after having been partially warmed to refrigerate the cryogenic rectification plant. A turboexpander is connected to the main heat exchanger to expand the oxygen enriched waste stream after having been partially warmed and to generate the exhaust stream. The main heat exchanger can be interposed between the high pressure inlet of the ejector and the bottom region of the column and is also configured such that the oxygen-rich liquid column bottoms stream subcools within the main heat exchanger.

As can be appreciated from the above description of the present invention in both aspects, the ejector is utilized in connection with a down-flow heat exchanger in a manner that is not found in the prior art. In operation of the ejector, a constriction or venturi located within the ejector lowers the pressure of the oxygen-rich liquid column bottoms stream to draw the stream of the oxygen-rich phase into a mixture that constitutes the combined oxygen-rich liquid stream. This operation takes over the function of a valve that would be employed to valve expand the oxygen-rich liquid column bottoms to a pressure and temperature suitable for condensing the nitrogen-rich vapor column overhead. Further, since the oxygen-rich liquid column bottoms can be supplied at pressure, embodiments of the invention can be practiced without the need for a separate pump or vapor lift heat exchanger.

BRIEF DESCRIPTION OF THE DRAWINGS

While the specification concludes with claims distinctly pointing out the subject matter that Applicants regard as their invention, it is believed that the invention will be better understood when taken in connection with the accompanying drawing in which the sole FIGURE illustrates an apparatus for carrying out a method in accordance with the present invention.

DETAILED DESCRIPTION

With reference to the FIGURE, a cryogenic rectification plant 1 is illustrated. Cryogenic rectification plant 1 has a main heat exchanger 10 for cooling a compressed and purified feed stream 12 to a temperature suitable for its rectification within a distillation column 14.

Compressed and purified feed stream 12 comprises nitrogen and oxygen and can be air. In the case of air, the stream would be compressed via a compressor and then purified by a purification unit, typically beds of alumina and/or molecular sieve operating in accordance with a temperature or pressure swing adsorption cycle in which moisture and other higher boiling impurities are adsorbed. While one bed is operating another bed is regenerated. Alternatively, compressed and purified air stream 12 could in fact be a nitrogen oxygen mixture from another cryogenic rectification plant that is located upstream of cryogenic rectification plant 1.

Main heat exchanger 10 is typically of aluminum plate-fin construction in which plate-like layers having fins are brazed together to form passageways for the various streams to be heated and cooled in indirect heat exchange. Multiple heat exchangers can be used as well known in the art.

Distillation column 14 contains mass transfer contact elements such as generally indicated by reference numerals 16 and 18 that can be known structured packing, sieve trays, random packing and etc. that are used for bringing vapor and liquid phases of the mixture to be separated into intimate contact with one another to effect the separation. The separation occurring within distillation column 14 produces a nitrogen-rich vapor column overhead that is located in a top region of the distillation column 14 as generally indicated by reference numeral 20 and a oxygen-rich liquid column bottoms 22 located in a bottom region of distillation column 14. The introduction of the compressed and purified feed stream 12 into distillation column 14 after having been suitably cooled produces an ascending vapor phase that is contacted with a descending liquid phase within elements 16 and 18. The descending liquid phase is initiated by condensing a part of the nitrogen-rich vapor column overhead 20 within a down-flow heat exchanger 24.

A stream 26 that is composed of the nitrogen-rich vapor column overhead 20 is withdrawn from a top region of distillation column 14 and divided into a first stream of nitrogen-rich vapor 28 and a second stream of nitrogen-rich vapor 30. As can be appreciated, first and second streams of nitrogen-rich vapor 28 and 30 could be separately withdrawn. The first stream of the nitrogen-rich vapor 28 is fully warmed within main heat exchanger 10 to produce a product stream 32. However, embodiments of the present invention are possible in which the first stream of the nitrogen-rich vapor 29 were introduced into another column for further refinement instead of being taken as a product. In this regard, the term "fully warmed" as used herein and in the claims means warmed to a temperature at the warm end of main heat exchanger 10 which is normally at or near ambient temperature. The warming of the first stream of the nitrogen-rich vapor 28 helps to cool the compressed and purified feed stream 12 by indirect heat exchange.

The second stream of nitrogen-rich vapor 30 is introduced into down-flow heat exchanger 24 that can be housed within a shell-like vessel 34 connected to distillation column 14. Down-flow heat exchanger 24 can also be of plate-fin construction that is fabricated of brazed aluminum in much the same manner as main heat exchanger 10. Alternatively, down-flow heat exchanger 24 can be of shell and tube design as described above. Second nitrogen-rich vapor stream 30 is condensed within down-flow heat exchanger 24 to produce a nitrogen-rich liquid stream 36. Part of nitrogen-rich liquid stream 36 can be introduced as a reflux stream 38 to reflux distillation column 14 and thereby initiate formation of the descending liquid phase. A portion 40 of the nitrogen-rich liquid stream 36 can be taken as a liquid nitrogen product.

An oxygen-rich liquid column bottoms stream 42 that is composed of the oxygen-rich liquid column bottoms 22 can be subcooled within main heat exchanger 10 within passages designed to perform such subcooling function. As such, the subcooler may be integrated into the main heat exchanger 10 as shown. However, as could be appreciated by those skilled in the art, the subcooler could be a separate unit in which oxygen-rich liquid column bottoms stream 42 were subcooled by indirect heat exchange with the first part of the nitrogen-rich vapor 28 and an oxygen enriched waste stream to be discussed. Furthermore, the subcooling function could be dispensed with entirely to simplify the construction of cryogenic rectification plant 1.

In the prior art, the resulting subcooled oxygen-rich liquid column bottoms stream is typically valve expanded to lower pressure then used to condensing the second part of the nitrogen-rich vapor stream 30. However, in accordance with the present invention, the resultant subcooled oxygen-rich liquid column bottoms stream serves as a motive fluid stream 44 that is introduced into a high pressure inlet 46 of an ejector (or jet pump) 48 to draw an oxygen-rich liquid phase stream 50 through a low pressure inlet 52 of ejector 48 and thereby to produce a combined oxygen-rich liquid stream 54. Depending upon column design or ejector specification the pressure or motive force of stream 44 may be augmented by way of a mechanical pump.

The combined oxygen-rich liquid stream 54 is introduced into a distribution reservoir 56 of down-flow heat exchanger 24. It should be noted that stream 54 could be filtered for entrained solid materials prior to introduction into reservoir 56. The combined oxygen-rich liquid stream 54 vaporizes as it flows in a downward direction of down-flow heat exchanger 24 to be partially vaporized into an oxygen-rich liquid phase 58 and oxygen-rich vapor phase 60. The oxygen-rich liquid phase 58 collects within shell 34 as oxygen-rich liquid 62 that serves as make-up for oxygen-rich liquid stream 50. In such manner, part of the oxygen-rich liquid phase 58 is recirculated back to reservoir 56 to prevent dry-out of the down-flow heat exchanger. It should be noted that a small drain from sump 62 may be configured for purposes of avoiding concentration of high boiling contaminants.

As mentioned above, ejector 48 is provided with a venturi or other constriction to generate a lower static pressure at the exit of the, ejector. Stream 54 is at a sufficiently low pressure and temperature to effect condensation of the second stream 30 of the nitrogen-rich vapor column overhead. Hence, ejector 48 functions in the present invention not only as a pump but also as a valve that takes the place of an expansion valve of the prior art. In so doing a fundamental thermodynamic irreversibility is eliminated while facilitating high efficiency condenser operation. Typically, distillation column 14 will be operated at between about 5 and 12 bar absolute. As noted, in some instances, a pump could be provided for to augment the pressure of motive fluid 44. However, the design of ejector 48 will vary with the actual requirements presented and can readily be accomplished by one skilled in the art.

An oxygen enriched waste steam 64 that is composed of the oxygen-rich vapor phase 60 is partially warmed within main heat exchanger 10 and then expanded within a turboexpander 66 to produce an exhaust stream 68 that is fully warmed within main heat exchanger 10 in order to refrigerate the cryogenic rectification plant 1. It is to be noted that as used herein and in the claims, the term, "partially warmed" means warmed to an intermediate temperature between the cold and warm end of main heat exchanger 10. Exhaust stream 68 is discharged at a pressure slightly above ambient. It is further to be noted that although oxygen enriched waste expansion is used in the illustrated embodiment, other types of expansion are possible to supply refrigeration to a cryogenic rectification plant could be used in connection with the present invention, including, boosting the pressure of part of the incoming compressed and purified feed stream 12 in a booster compressor and then partially cooling said stream and introducing the same into a turboexpander to generate an exhaust stream that can be utilized to supply refrigeration. The exhaust stream 68 after warming may then be used to regenerate prepurification means (not shown).

While the present invention has been described with reference to a preferred embodiment, as will occur to those skilled in the art, numerous changes and additions and omissions can be made without departing from the spirit and the scope of the present invention as recited in the presently pending claims.

We claim:

1. A method of separating a nitrogen product from a compressed and purified feed stream comprising nitrogen and oxygen, said method comprising:

separating the nitrogen from the compressed and purified feed stream within a distillation column of a cryogenic rectification plant to produce a nitrogen-rich vapor column overhead and an oxygen-rich liquid column;

generating reflux for the distillation column within the cryogenic rectification plant by condensing a portion of the nitrogen-rich vapor within a down-flow heat exchanger associated with the distillation column through indirect heat exchange with a combined oxygen-rich liquid stream, thereby partially vaporizing the combined oxygen-rich liquid into an Oxygen-rich liquid phase and an oxygen-rich vapor phase; and introducing an oxygen-rich liquid column bottoms stream composed of the oxygen-rich liquid column bottoms into an ejector as a motive fluid and drawing a stream of the oxygen-rich liquid phase into the ejector and into the oxygen-rich liquid column bottoms stream, thereby to form the combined oxygen-rich stream; and discharging the combined oxygen-rich stream from the ejector to the down-flow heat exchanger thereby to recirculate part of the oxygen-rich liquid phase thereto, the combined oxygen-rich stream being discharged from the ejector at a pressure sufficient to condense the nitrogen-rich vapor within the down-flow heat exchanger.

2. The method of claim 1, wherein:

the compressed and purified feed stream is cooled within a main heat exchanger of the cryogenic rectification plant to a temperature suitable for its rectification;

an oxygen enriched vapor stream composed of the oxygen-rich vapor phase is partially warmed within the main heat exchanger and introduced into a turboexpander to produce an exhaust stream; and the exhaust stream is recirculated back to the main heat exchanger and fully warmed therein to refrigerate the cryogenic rectification plant.

3. The method of claim 2, wherein the oxygen-rich liquid column bottoms stream is subcooled within the main heat exchanger.

4. The method of claim 1, wherein the compressed and purified feed stream is composed of air.

5. An apparatus for separating a nitrogen from a compressed and purified feed stream comprising nitrogen and oxygen, said apparatus comprising:

a cryogenic rectification plant having a main heat exchanger for cooling the compressed and purified feed stream to a temperature suitable for its rectification and a distillation column connected to the main heat exchanger for rectifying the compressed and purified feed stream and thereby producing a nitrogen-rich vapor overhead and an oxygen-rich liquid column bottoms;

a down-flow heat exchanger operatively associated with the distillation column for generating reflux for the distillation column, the down-flow heat exchanger connected to the distillation column so as to condense part of the nitrogen-rich vapor through indirect heat exchange with a combined oxygen-rich liquid stream, thereby partially vaporizing the combined oxygen-rich liquid stream into an oxygen-rich liquid phase and an oxygen-rich vapor phase; and an ejector having a high pressure inlet in flow communication with a bottom region of the distillation column so that an oxygen-rich liquid column bottoms stream enters the ejector as a motive fluid, a low pressure inlet in flow communication with the down-flow heat exchanger so as to draw a stream of the oxygen-rich liquid phase into the oxygen-rich liquid column bottoms stream and form the combined oxygen-rich liquid stream and an outlet connected to the down-flow heat exchanger to-discharge the combined oxygen-rich liquid stream to the down-flow heat exchanger, thereby to recirculate part of the oxygen-rich phase back to the down-flow heat exchanger;

the ejector configured such that the combined oxygen-rich liquid stream is at a sufficiently low pressure so as to enable the combined oxygen-rich stream to condense the part of the nitrogen-rich vapor within the down-flow heat exchanger.

6. The apparatus of claim 5, wherein:

the main heat exchanger is configured to partially warm an oxygen enriched waste stream formed from the oxygen-rich vapor phase and to fully warm an exhaust stream produced by expanding the oxygen enriched waste stream after having been partially warmed to refrigerate the cryogenic rectification plant; and a turboexpander is connected to the main heat exchanger to expand the oxygen enriched waste stream after having been partially warmed and to generate the exhaust stream.

7. The apparatus of claim 6, wherein the main heat exchanger is interposed between the high pressure inlet of the ejector and the bottom region of the column and is also configured such that the oxygen-rich liquid column bottoms stream subcools within the main heat exchanger.

* * * * *